H. L. HUBBARD.
SPRING SUSPENSION FOR VEHICLES.
APPLICATION FILED APR. 10, 1912.
1,058,588.
Patented Apr. 8, 1913.
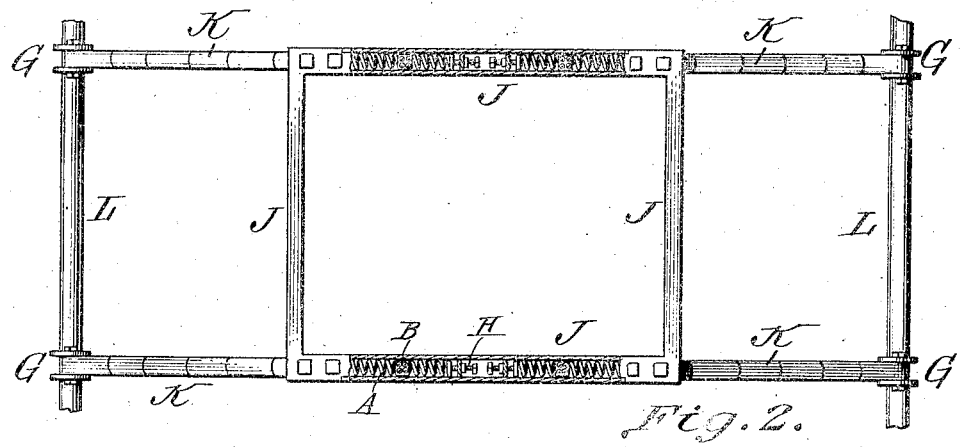
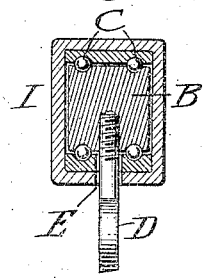
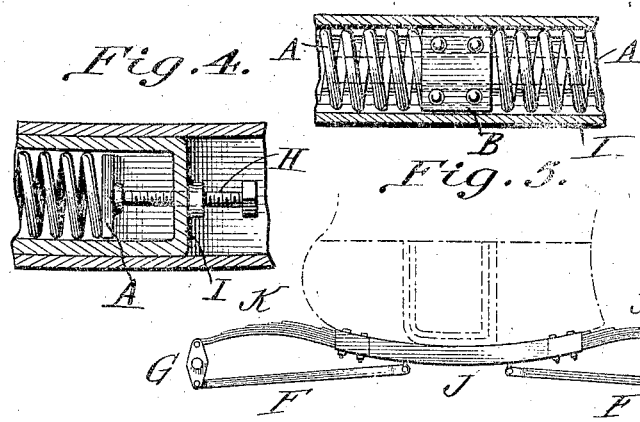
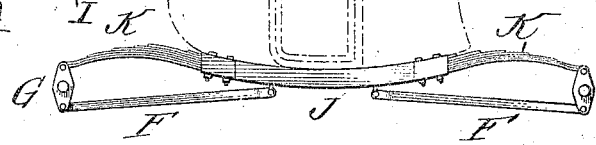
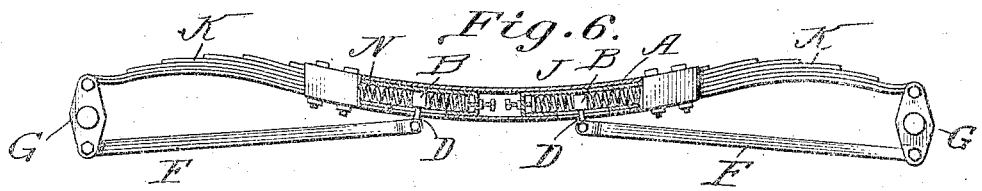
Witnesses.
Ed. Schlash
Hudson D. Henrion
Inventor:
Henry L. Hubbard

UNITED STATES PATENT OFFICE.

HENRY L. HUBBARD, OF DETROIT, MICHIGAN.

SPRING SUSPENSION FOR VEHICLES.

1,058,588.  Specification of Letters Patent.  Patented Apr. 8, 1913.

Application filed April 10, 1912. Serial No. 689,931.

*To all whom it may concern:*

Be it known that I, HENRY L. HUBBARD, a citizen of the United States, and a resident of Detroit, in the county of Wayne and State of Michigan, have invented an Improved Spring Suspension for Vehicles, of which the following is a specification.

My invention is an improvement in running gear for riding vehicles, particularly such as employ electricity as a motive agent.

The main spring support for a vehicle body is formed of a central horizontal frame and leaf spring secured to its four corners and pivotally connecting the frame with the axles.

The improvement is embodied particularly in an auxiliary spring attachment, the construction and arrangement of which are such that it reinforces the main spring support in the manner hereinafter described and illustrated in the accompanying drawing, in which—

Figure 1 is a plan of the main spring support with a portion of the auxiliary attachment shown in horizontal section. Fig. 2 is a combined longitudinal section and side view of a portion of the auxiliary spring attachment proper. Fig. 3 is a cross section of such auxiliary attachment. Fig. 4 is a longitudinal section showing the arrangement of the set-screws for adjusting the tension of the auxiliary springs proper. Fig. 5 is a side view of the main and auxiliary spring support with a portion of a vehicle body shown by dotted lines in due position on the frame. Fig. 6 is an enlarged side view of the main spring support with a portion of the auxiliary attachment shown in longitudinal section.

In Figs. 1 and 6, J indicates a rectangular frame having channel side bars, and K indicates four leaf springs which are bolted to the corners of the said frame, their outer ends being pivotally attached to rockers G which are fixed on the front and rear axles L. The said frame J constitutes the support proper for the body of a vehicle, as illustrated by dotted lines in Fig. 5, and the frame and leaf springs together serve also as an elastic reach connecting the two axles L. In connection with these parts, I have devised an improved auxiliary spring attachment whose construction and operation are as follows: In each of the channel side bars of the frame J I secure elongated metal boxes that serve as housings for a pair of spiral or coil springs A and metal block B which is arranged between the springs. The block is slidable in the housing and provided with antifriction bearings in the form of balls C that run in grooves in the housing. Each block has a pendent screw eye D that serves as a hanger or point of attachment for a combined tension and compression rod F whose forward end is pivoted on the lower portion of the adjacent axle rocker G. The shanks of the hangers D pass through slots in the housing and channel bars, as shown in Figs. 3 and 6. It will now be apparent that any vertical oscillation of the main support comprising the frame J and springs K will, through the medium of the tension and compression rods F, effect a greater or less compression of one or the other of the two alined springs A of each pair. In other words, the auxiliary spring attachment comprising the coil springs A, blocks B, and rods F serve to supplement the function of the main spring support J, K, and also reinforce and strengthen the main support. The tension of the coil springs A is regulated according to the average load weight by means of set-screws H which, as shown in Figs. 1 and 4, are screwed through the ends of each housing I and bear against the outer ends of said springs. Each set-screw is provided with a jam nut for holding it fixed in any position to which it may be adjusted.

What I claim is:—

1. The improved spring suspension for vehicle bodies, comprising a frame, leaf springs secured to the several corners of the same, and axles to which the springs are attached, pairs of coil springs arranged on the side bars of such frame, a block interposed between the springs of each pair, and tension and compression rods connecting such blocks with the axles, as described.

2. The improved spring suspension for vehicle bodies, comprising a frame having parallel channel side bars, leaf springs secured to the several corners of the frame and axles to which the outer ends of said springs are attached, box-like housings arranged on the said side bars, pairs of coil springs arranged in such housings, together with a slidable block which is interposed between them, and combined tension and compression rods connecting the several blocks with the adjacent axle, as described.

HENRY L. HUBBARD.

Witnesses:
WM. A. BLACK,
HARRISON E. WELTON.